United States Patent

[11] 3,597,767

[72] Inventor Jan Prahl
       Gollenhof, Germany
[21] Appl. No. 854,860
[22] Filed Sept. 3, 1969
[45] Patented Aug. 10, 1971
[73] Assignee William J. Teufel
       Stuttgart, Germany
[32] Priority Oct. 2, 1968
[33] Germany
[31] P 18 00 500.0

[54] ADJUSTABLE TUBULAR SKELETAL SYSTEMS FOR ARTIFICIAL LIMBS
9 Claims, 6 Drawing Figs.

[52] U.S. Cl. .................................................... 3/21, 3/22
[51] Int. Cl. .................................................... A61f 1/08
[50] Field of Search ........................................... 3/1, 2, 21—29

[56] References Cited
UNITED STATES PATENTS
3,422,462  1/1969  Finnieston ..................... 3/21

FOREIGN PATENTS
847,794   8/1952   Germany ..................... 3/21
214,096   4/1924   Great Britain ................ 3/21
978,586  12/1964   Great Britain ................ 3/21

Primary Examiner—Richard A. Gaudet
Assistant Examiner—Ronald L. Frinks
Attorney—Richard Low ABSTRACT: A tubular skeletal system for a limb prosthesis includes a plurality sections some of which are joint sections while others are limb sections. Each joint section terminates in an end surface directed toward a limb section, and this end surface forms part of a wall which is formed with an elongated slot. A connector is connected to a limb section and has a slotted wall terminating in an end surface which engages the end surface of an adjacent joint section. A bolt has a pair of perpendicularly elongated portions which are respectively received in the slot in a connector and in the slot in an adjacent joint section. Beyond the elongated portions, the bolt has a threaded shank extending into a nut which can be turned to tightly draw the abutting surfaces of the connector and joint section against each other.

Patented Aug. 10, 1971
3,597,767
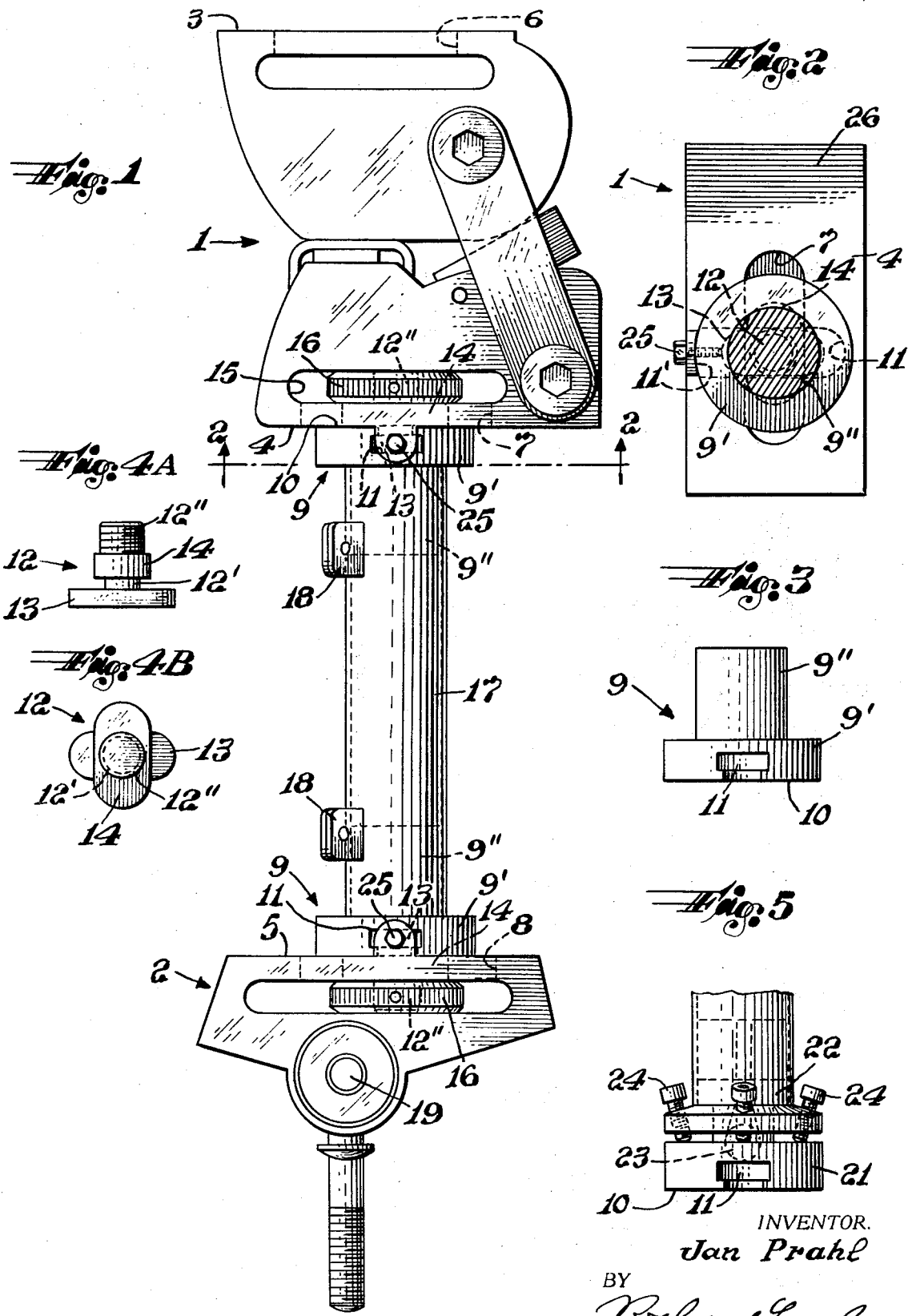

3,597,767

ADJUSTABLE TUBULAR SKELETAL SYSTEMS FOR ARTIFICIAL LIMBS

BACKGROUND OF THE INVENTION

The invention relates to artificial limbs.

More particularly, the present invention relates to adjustable limb prostheses which are in the form of tubular skeletal systems so as to achieve prostheses of a lightweight flexible construction.

While prostheses of this general type are well known so as to adapt them to a given individual, it is necessary to provide the possibility of different adjustments. For example, sections of such an artificial limb may terminate in end plates which are shiftable one with respect to the other. Such end plates may be guided by way of dovetail slots and can fixedly be held in their adjusted positions by adjusting screws.

These known constructions require an assembly of undesirably great height and an undesirably great weight.

SUMMARY OF THE INVENTION

It is accordingly the primary object of the present invention to provide a tubular skeletal prosthesis system which avoids the above referred to drawbacks.

An important object of the invention is to provide an adjustable prosthesis, such as a leg prosthesis, having different sections, such a stump section, a limb section, and joint sections, and being capable of being adjustably interconnected with a simple inexpensive structure, while maintaining the height and weight of the entire assembly relatively low.

Another object of my present invention is to provide a construction which does not require many different components so that by using a relatively small number of different parts it is possible to achieve the results of the invention.

Still another object of the invention is to provide a construction which can receive any well known types of joints without requiring an increase in the height of the entire assembly.

It is a further object of the invention to provide parts which are replaceable for the purpose of effecting either adjustments in mutually perpendicular planes or adjustments not only in mutually perpendicular planes but also angular adjustments.

According to the invention, the artificial limb includes a section, such as a joint section, and an additional section, such as a limb section. The joint section has a wall which terminates in an end surface directed toward the limb section. The latter is fixed to a connector which terminates in a surface directed toward the end surface of the joint section. The referred to wall of the joint section is formed with an elongated slot which in the case of a leg prosthesis extends parallel to the longitudinal axis of the foot. The connector has a wall which is provided with said surface that is directed toward and engages the end surface of the joint section. This connector wall is formed with an elongated T-slot which extends perpendicularly with respect to the slot in the joint section. A bolt is provided with a pair of axially displaced elongated portions extending transversely across the bolt axis and being mutually perpendicular, these elongated bolt portions being respectively received in the mutually perpendicular slots so that the connector and joint section can be adjusted one with respect to the other by relative movement of the sections and the elongated portions of the bolt. The shank of the bolt has a threaded end portion on which a nut is placed for the purpose of tightly drawing the surfaces of the connector and joint section against each other to maintain the parts in their adjusted positions.

BRIEF DESCRIPTION OF A DRAWING

The invention is illustrated by way of example in the accompanying drawing which form parts of this application and in which:

FIG. 1 is an elevational view of an elongated artificial limb which in the illustrated embodiment forms a leg prosthesis;

FIG. 2 is a plan view of a connector and a wall of a joint section, viewed toward the plane of the line 2-2 of FIG. 1;

FIG. 3 is an elevational view of a connector;

FIGS. 4A and 4B are an elevation and a plan view, respectively, of a bolt which forms part of the assembly of the invention; and FIG. 5 is an elevation of a modified embodiment of a connector.

DESCRIPTION OF PREFERRED EMBODIMENTS

Referring to the drawing in greater detail now, and initially to FIG. 1, the leg prosthesis shown in FIG. 1 includes an upper joint section 1 forming the knee joint. The knee joint is shown as a polycentric knee whose general operation and action is well known. The knee joint 1 terminates in an upper wall 3 and a lower wall 4, which two walls are formed with an elongated slot 6 and 7, respectively. These slots extend in directions parallel to the longitudinal axis of the foot.

Beneath the knee joint 1 is a lower joint section 2 which forms the ankle joint and terminates in an upper wall 5 formed with an elongated slot 8 that is parallel to the slots 6 and 7. The ankle joint 2 turnably carries a pivot pin or bolt 19 which is connected in a known way to an artificial foot. Between the joint sections 1 and 2 is an elongated tube 17 which corresponds to a limb section or the shank of the leg.

There is a connector 9 between the knee section 1 and the limb section 17, while another connector 9 is situated between the ankle section 2 and the limb section 17. Each connector 9 has an outwardly directed flange 9' forming a part which is located next to the respective joint section, and an elongated reduced tubular portion 9'' aligned with and extending into the tubular limb section 17. The latter is clamped to the reduced tubular portion of each of the connectors 9 by way of a clamp 18.

The construction of the connectors 9 is shown by itself in FIGS. 2 and 3. It will be seen that the flange 9' of each connector 9 terminates in an end surface 10 and is formed with an elongated T-Slot 11 which extends diametrically across the circular wall of flange 9' but terminates short of the periphery thereof, as is particularly apparent from FIG. 2. The width of the slot 11 at the end surface 10 is less than that at a distance away from the surface 10.

A bolt 12 is provided for interconnecting the slotted flange or part 9' of each of the connectors 9 with the respective slotted wall at the end of the joint sections. The bolt 12 is illustrated in FIGS. 4A and 4B. It includes a pair of elongated portions 13 and 14 which extend perpendicularly with respect to the axis of the shank of the bolt and are perpendicular with respect to each other, the bolt portions 13 and 14 having rounded ends so as to be of a substantially oval configuration. Between the elongated bolt portions 13 and 14, the portion 12' of the shank of bolt is of a reduced diameter so as to be adapted to extend through the narrow part of the T-slot 11, while beyond the elongated portion 14 the shank of the bolt 12 has a threaded end portion 12'' adapted to be threaded into a central threaded bore of a disk-shaped nut 16.

Initially, the slot 11 has an open end at 11' (FIG. 2) through which the elongated portion 13 of the bolt 12 is introduced into the slot. Thereafter, the open end 11' of the slot 11 is blocked, as by providing in the region of the open end a threaded bore into which a screw 25 extends to be in the path of movement of the portion 13, so that in this way the portion 13 of the bolt 12, while being movable along the slot 11, cannot be removed therefrom.

The elongated portion 14 of the bolt 12 is placed, for instance, within the slot 7, at the connection between the tubular limb section 17 and the knee joint 1, but prior to the introduction of the portion 14 into the slot 7, a thin disc 16, which is formed with a central threaded bore to provide a nut, is introduced through a narrow elongated slot 15 in the section 1 to a location where the threaded shank portion 12'' of the bolt 12 will be received in the nut 16. With the shank of the bolt 12 aligned with the nut 16, the latter is turned so as to draw the shank into the nut, and with the bolt still loosely connected with the nut 16 it is possible to provide mutually perpendicular adjustments of the section 1 and the section 17 with respect to each other. Once the desired adjustment is achieved, the nut 16 can be turned so as to draw the bottom surface of the wall 4 and the abutting surface 10 of the respective connector 9 tightly against each other so as to maintain all the parts in their adjusted positions. The adjusted position of the nut 16 can be reliably maintained as by providing in the nut 16 a transverse setscrew which may be tightened against the threaded portion 12″ of the shank of the bolt 12.

It will be seen, therefore, that with the construction of the invention, which may be repeated at the connection between the limb section 17 and the ankle joint 2, in the manner illustrated in FIG. 1, as well as, for example, between the wall 3 and a stump section (not shown), a relatively small number of components are required, namely the connector 9, the bolt 12, and the nut 16, so that this small number of elements can be used to achieve the required connection without substantially increasing the height of the entire assembly and without any substantial increase in the weight thereof.

It will be noted that with this construction it is not possible for the connector 9 to turn with respect to the joint section to which it is adjustably fastened.

In order to retain the elongated portion 13 of the bolt 12 within the slot 11 it is only required, it is repeated, to thread a screw into a corresponding threaded bore of the connector 9 at the open end of the slot 11.

The extend of adjustment which is possible with the structure of the invention is apparent from FIG. 2. FIG. 2 illustrates that the extent of adjustment along the slot 7 is greater than the extent of adjustment along the slot 11. However, no turning of a connector 9 and the associated joint section with respect to each other is possible.

A particularly good fixing of the components in their adjusted positions can be achieved if the abutting end surfaces of the connector 9 and wall 4 are provided with elongated serrations 26 which extend, for example, perpendicularly with respect to the slot 7 which represents the primary adjusting direction since the extent of adjustment along the slot 7 is greater than the extent of adjustment along the slot 11. Of course, a similar feature can be provided between the connector 9 and the joint section 2 at the wall 5 of the latter. The serrations 26 are partly indicated in FIG. 2.

In some cases it may be desired to provide an angular adjustment as well as a pair of mutually perpendicular adjustments, and for this purpose the connector of FIG. 3 may be replaced by that shown in FIG. 5. The connector of FIG. 5 has a wall 21 corresponding to the wall of the connector 9 which is formed with the T-slot 11, and it will be noted from FIG. 5 that the wall 21 is indeed formed with the slot 11 and terminates in the end surface 10 which abuts against the surface of the respective joint section. However, in the embodiment of FIG. 5 there is a second wall 22 which has a tubular extension to be received in the limb section 17, and which is connected with the wall 21 by way of a ball-and-socket joint 23 so that the walls 21 and 22 can be angularly turned in all directions one with respect to the other. The wall 22, at its flange portion which extends outwardly beyond its tubular extension, is formed with a plurality of inclined threaded bores through which adjusting screws 24 extend, so that by turning these screws the wall 22 can be fixed in any desired angular position with respect to the wall 21.

Of course, in the illustrated example where the walls 21 and 22 are relatively close to each other, the extent of angular adjustment is relatively limited. However, the extent of angular adjustment can be increased as required, for example, by providing several of the connectors of the type shown in FIG. 5 so that part of the adjustment can be achieved at one end of the limb section 17 and the remainder of the adjustment can be achieved at the other end of the limb section 17. Inasmuch as these angularly adjustable connectors of FIG. 5 correspond in dimensions to the connector 9 shown in FIG. 3, it is only required to replace a connector of FIG. 3 with that of FIG. 5, and the latter can simply remain in the entire assembly without any problems because it has a size corresponding to that of the connector of FIG. 3.

It is thus apparent that with the structure of the invention the tubular skeletal prosthesis system requires only limb sections and joint sections and the connectors of the invention for interconnecting these limb sections and joint sections, with all of the connectors being identically constructed in the manner shown in FIG. 3 or being replaceable by an angularly adjustable connector as shown in FIG. 5 and described above. By providing for each connector a relatively long tubular extension which is received in the tubular limb section, such as the limb section 17, a relatively large range of adjustment is achieved in the length of the artificial limb, so that with such a construction a relatively small number of artificial limbs of different lengths will be able to accommodate many different individuals or users of the present prosthesis. Thus, it is necessary to maintain on hand only a relatively small number of different sizes of a given prosthesis.

I claim:

1. In a tubular skeletal system of a limb prosthesis, a pair of adjoining prosthesis sections one of which is a joint section and has a wall terminating in an end surface directed toward the other section, said other section being a limb section, a connector fixed to said limb section and having a wall terminating in an end surface which engages the end surface of said wall of said joint section, said connector being formed in said wall thereof with an elongated straight slot having at said end surfaces a width less than in the region of said slot distant from said surfaces, said wall of said joint section being formed with an elongated straight slot perpendicular to said slot in said connector, a connecting bolt having a pair of mutually perpendicularly elongated portions displaced axially along the bolt and respectively received in said slots for longitudinal movement therein, and nut means coacting with said bolt for pressing said surfaces tightly against each other after said connector and the limb section connected thereto are adjusted with respect to said joint section.

2. The combination of claim 1 and wherein said slot of said connector is a T-slot and said bolt has between its mutually perpendicular elongated portions a shank of reduced size extending through the part of said T-Slot which is of the smallest width.

3. The combination of claim 1 and wherein said elongated portions of said bolt have rounded ends.

4. The combination of claim 1 and wherein said nut is in the form of a relatively flat disc which threadedly receives a threaded shank portion of said bolt, extending beyond that part thereof which is received in the slot of said wall of said joint section, and said joint section being formed with a second elongated slot through which the nut of disc-shaped configuration extends to have an operative connection with the threaded shank portion of the bolt.

5. The combination of claim 1 and wherein said prosthesis sections form part of an artificial leg, said slot in said wall of said joint section extending parallel to the longitudinal axis of the foot.

6. The combination of claim 1 and wherein the wall of said connector which is formed with said slot thereof is in the form of a flange projecting from a tubular extension fixed to a tubular part of the limb section.

7. The combination of the claim 1 and wherein said connector has, in addition to said wall formed with said slot, a second wall and a ball joint interconnecting said second wall with said slotted wall thereof, said second wall having a tubular extension adapted to be releasably fixed with a tubular part of the limb sections, and a plurality of adjusting screws extending through said second wall and engaging said slotted wall of said connector for adjusting the angle between the latter walls.

8. The combination of claim 1 and wherein said end surfaces are respectively provided with serrations to achieve a high coefficient of friction therebetween.

9. The combination of claim 8 and wherein said connector and wall of said joint section are movable one with respect to the other in a given primary direction, and said serrations extending transversely of said primary direction.